Figure 1:
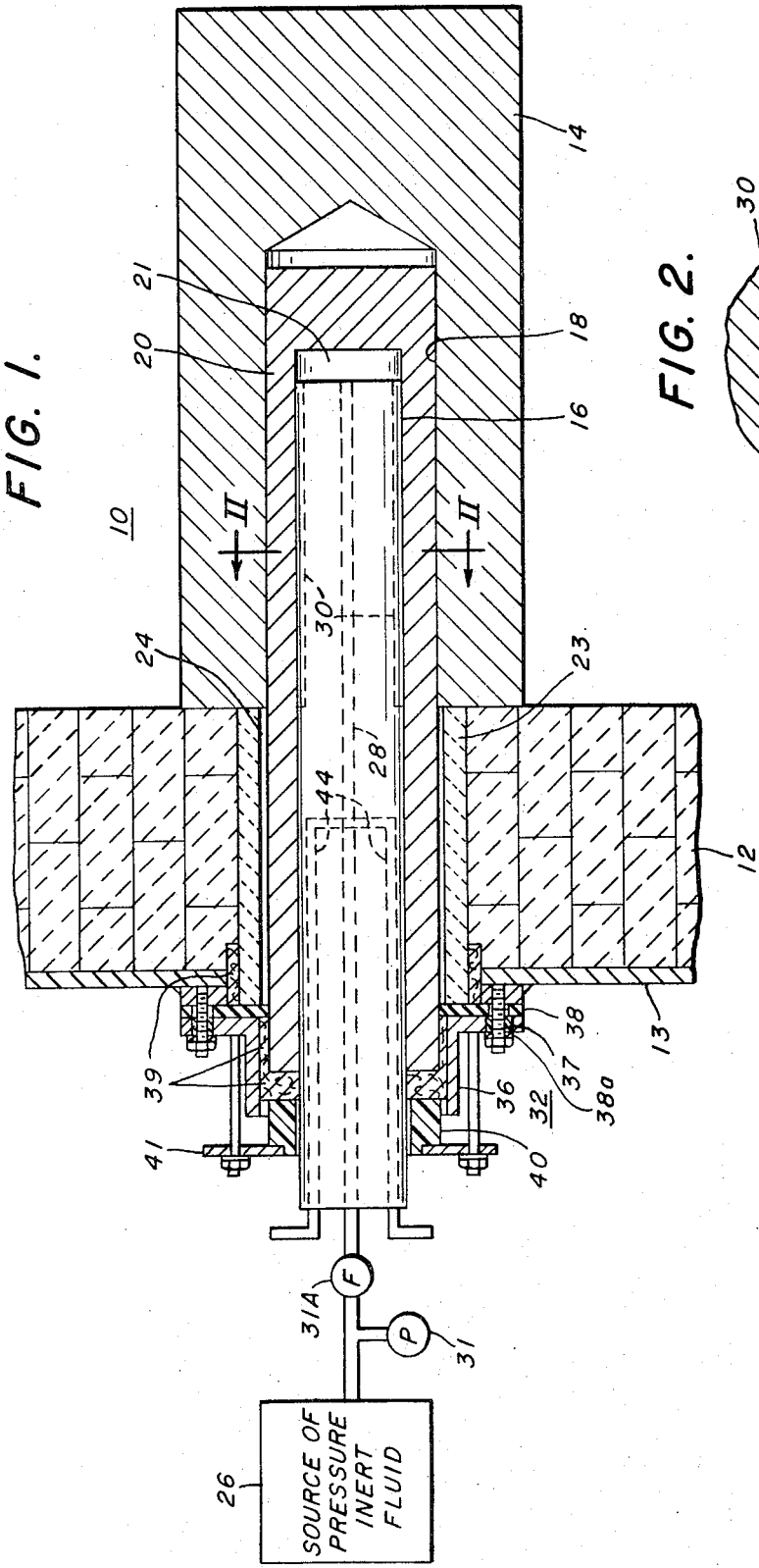

United States Patent [19]
Jacobs

[11] 3,809,794
[45] May 7, 1974

[54] FLUID SHEATHED ELECTRODE LEAD FOR USE IN CORROSIVE ENVIRONMENT
[75] Inventor: Stanley C. Jacobs, Lower Burrell, Pa.
[73] Assignee: Aluminum Company of America, Pittsburgh, Pa.
[22] Filed: Dec. 26, 1972
[21] Appl. No.: 318,235

Related U.S. Application Data
[62] Division of Ser. No. 178,282, Sept. 7, 1971, Pat. No. 3,745,106.

[52] U.S. Cl............ 174/11 BH, 174/15 BH, 174/18, 174/31.5, 204/243 R, 204/286
[51] Int. Cl........ H01b 17/26, C22d 3/02, B01k 3/04
[58] Field of Search..... 174/8, 11 R, 11 BH, 14 BH, 174/15 BH, 16 BH, 18, 31 R, 31.5, 151; 204/243 R, 280, 286

[56] References Cited
UNITED STATES PATENTS
2,865,972  12/1958  Augsburger ............ 174/15 BH UX
3,213,182  10/1965  Rordorf ................... 174/18
3,341,648  9/1967   Molstedt et al. ........... 174/15 BH X Primary Examiner—Laramie E. Askin
Attorney, Agent, or Firm—Elroy Strickland

[57] ABSTRACT

An improved electrode assembly for use in an electrolytic cell perimetrically confining a corrosive fluid environment. Included therein is an electrode element exposed to said environment, at least one low resistance current carrying lead of material susceptible to deleterious attack by corrosive components of such environment having one end traversing a wall of the cell and extending into the electrode element; the other end of the lead is disposed externally of the cell wall, and a plurality of sleeve members are disposed around a portion of the lead traversing the cell wall to inhibit contact of said corrosive components with the exterior shell of said cell and with said lead. Means are provided for maintaining a protective sheath of inert gaseous fluid surrounding the lead member, at a pressure of a magnitude sufficient to repel and thereby prevent contact of approaching corrosive component with the lead member.

7 Claims, 2 Drawing Figures

FLUID SHEATHED ELECTRODE LEAD FOR USE IN CORROSIVE ENVIRONMENT

This is a division of application Ser. No. 178,282, filed Sept. 7, 1971, now U.S. Pat. No. 3,745,106.

This invention relates to an improved electrode structure for use in a corrosive environment and particularly to an electrode structure for use in electrolytic reduction cells employed in the production of aluminum from aluminum chloride dissolved in a molten halide bath.

Although the potential advantages of utilizing aluminum chloride as a source material in the electrolytic reduction of aluminum have long been recognized, commercial realization thereof has been effectively precluded by the attendant presence of many unsolved problems of long standing not the least of which has been the provision of low resistance electrode assemblies for applying and removing current from the cells employed in the reduction process of a character that can withstand attack by the highly penetrative and corrosive environmental constituents, such as the molten halide bath and chlorine gas for appreciable periods of time.

The requisite efficiency and economy of operation that are necessarily attendant commercial cell performance dictate the utilization of low resistance, high current carrying conductor members wherever possible in electrode assemblies of the type herein of concern. Materials of such character, however, suitably conductive metals, are particularly subject to deleterious, if not rapidly destructive, attack by the highly penetrant and corrosive constituents of the fluid environment. The rapid deterioration of the electrode assembly components not only results in markedly reduced cell performance but in frequent shut down and undue repair and maintenance time and expense, all of which are antithetical to the necessary operational requisites for continuous commercial quantity production of aluminum from aluminum chloride.

This invention may be briefly described as an improved electrode assembly for use in an electrolytic cell that perimetrically confines a highly corrosive fluid environment such as that encountered in the electrolytic reduction of aluminum from aluminum chloride dissolved in a molten halide bath. In its broad aspects the subject invention includes the maintenance of a sheath of inert gaseous fluid about a corrosion susceptible low resistance current carrying bar or lead member that traverses the cell wall and terminates within an internally located electrode element and at a pressure of a magnitude sufficient to repel and thereby prevent the contact of approaching corrosive fluid components therewith as well as providing a fail-safe indication of corrosive attack at the initiation thereof. In its narrower aspects, the subject invention includes a multi-element electrode assembly having an elongate conducting sleeve disposed around an independently cooled low resistance lead member that traverses the cell wall and extends into the internally located electrode element and an insulating sleeve disposed in concentric spaced relation therewith in such manner as to provide an elongate annular barrier path for the penetrant corrosive fluids. In the operation thereof contact of the highly conductive corrosive penetrant material with the conducting shell of the cell is avoided, if not effectively precluded, by the selectively induced freezing of the penetrant corrosive material in said barrier path at locations remote from the cell shell and associated seals and packing glands as aided by a selective temperature gradient maintained by the independently cooled low resistance lead member.

Among the advantages of the subject invention is the provision of an electrode assembly that is effectively impervious to the corrosive penetrant fluids present in electrolytic reduction of aluminum from aluminum chloride dissolved in a molten halide bath with a concomitant extension of the operating life of the cell. Another advantage is the provision of a readily recognizable indication of incipient deterioration of an electrode assembly occasioned by initial penetration of corrosive fluid into proximity with the cell wall traversing low resistance current carrying core member thereof. A further advantage of the subject invention is the solution of one of the many problems that has heretofore impeded the attainment of the economic and efficient electrolytic production of aluminum from aluminum chloride.

The object of this invention is the provision of an improved electrode assembly for electrolytic reduction cells for production of aluminum from aluminum chloride dissolved in a molten halide bath.

Figure 2:
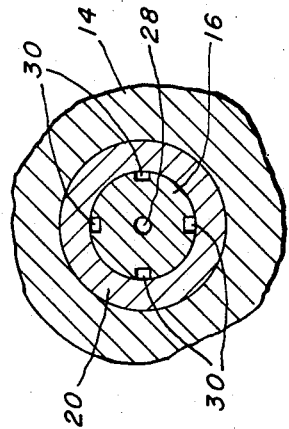

The subject invention, along with its advantages and objectives, will best be understood from consideration of the following detailed description in connection with the accompanying drawing in which:

FIG. 1 is a sectional view of an electrode assembly constructed in accordance with the principles of the present invention; and FIG. 2 is a sectional view of the electrode assembly of FIG. 1 taken along lines II—II thereof.

PREFERRED EMBODIMENT OF THE INVENTION

Referring now to the drawing, there is illustrated, in longitudinal section, an electrode assembly 10 mounted in the wall of an electrolytic cell for the production of metallic aluminum. The cell wall, which is only fragmentarily shown and which may constitute a top, side or other perimetrically defining housing means includes a relatively thick refractory heat insulating lamina 12 and an outer metal shell 13 of conducting character and conventionally electrically grounded. Such cell wall is adapted to confine a highly corrosive environment, for example, as would be present in the electrolysis of aluminum chloride dissolved in a molten halide bath, such as one or more alkali metal halides, in the production of metallic aluminum. The corrosive fluids that are so present, such as the molten bath constituents and the chlorine gas generated in the electrolysis process, are highly penetrative and highly corrosive to metals, particularly at the elevated temperatures encountered in the operation of such cells.

The illustrated electrode assembly 10 comprises a main electrode element 14 disposed within the cell and exposed to the described corrosive environment and at least one low resistance, current carrying lead member 16 suitably in the form of an elongated metal bar or rod traversing the cell wall and having one terminal end thereof extending into an opening or bore 18 in that portion of the main electrode element abutting the cell wall and the other end thereof disposed externally of the cell for convenient electrical connection thereto.

An elongate electrode sleeve 20 made of a substantially impervious, electrically conductive material, such as a dense graphite material, desirably surrounds the metal bar member 16 and is sized to extend into the bore 18 and to traverse the cell wall. For good electrical contact purposes, the internal cross-sectional dimension of the electrode sleeve 20 and the outer cross-sectional dimension of the low resistance current carrying lead member 16 are selected to provide a relatively tight fit along the length of the sleeve and lead. Such a tight fit, under proper operating conditions provides for good electrical contact between the lead and sleeve.

In a similar manner good electrical conductivity between the main electrode element 14 and the conductive sleeve 20 is provided by a force fit between the two. Selecting dimensions for the sleeve 20 and the bore 18 in the electrode element to provide ease of insertion and removal of the sleeve 20 with such type fit, can be effected by providing the outer, cross-sectional dimension of the sleeve 20 with a slight decreasing dimension taper lengthwise thereof in the direction of the electrode body.

The electrode sleeve 20 preferably extends over the full length of the portion of the low resistance lead member 16 that is disposed within the main electrode element and is provided with a closed end, as shown in FIG. 1, to completely enclose the lead member 16 therewith. However, the sleeve 20 may be open ended and extend less than the full length of the portion of lead member 16 enclosed by the main electrode element 14. In addition, as shown in FIG. 1, a space 21 is desirably provided between the end of the lead 16 and the inner closed end surface of the sleeve 20.

The main electrode element 14, as shown in FIG. 1, is conveniently disposed in abutting interfacial relation against the inside surface of the insulating cell wall 12, and can be of such size as to extend along the wall a substantial distance. In such a case, a plurality of electrode assemblies of the type described herein will be employed with the single main electrode element 14 for the purpose of reducing resistance by shortening the current flow path through the main electrode in supplying electrical current thereto if the electrode is an anode, and removing current therefrom if the electrode is a cathode.

As shown in FIG. 1, an electrically insulating sleeve 23 defining a cell wall traversing aperture concentrically surrounds that portion of the electrode sleeve 20 extending through the cell wall and is sized to accommodate the electrode sleeve. An elongated annular space 24 is shown between the two sleeves, and is exaggerated for purposes of illustration. A tight fit between the two sleeves is essentially precluded because the material of the insulating sleeve (preferably silicon oxynitride or quartz) is not easily prepared (i.e. machined) to provide such a fit, and the electrode sleeve has a slightly greater coefficient of expansion than the insulating sleeve. Further, it is desirable that the two sleeves fit loosely for ease of assembly and disassembly purposes. The sleeve 23 thus not only electrically insulates the conductive electrode sleeve 20 and the conductive lead member 16 from the normally grounded metal shell 13 of the cell wall 12 but cooperatively provides an elongate barrier path for the flow of penetrant corrosive fluid in the form of the annular space 24.

In an electrolytic cell in which a highly corrosive environment of the type herein of concern exists, the highly penetrant and corrosive gaseous and liquid components thereof tend to penetrate the main electrode element 14 due to its inherent porosity and to seep through the interface thereof with the cell wall and to contact the internally disposed conductors feeding and removing current therefrom. Thus in FIG. 1, without provision for protection for the low resistance metal lead 16, such corrosive components would tend to seep along the interface between the wall 12 and the electrode body 14 and through the pores of the electrode body 14 itself into contact therewith.

In accordance with the principles of this invention, a sheath of an inert fluid, suitably gaseous, that will not chemically react to any substantial extent with the materials of the lead or bar member 16, the main electrode element 14 and electrode sleeve 20, is maintained about said corrosion susceptible lead member 16 at a pressure sufficient to repel and thereby prevent the contact of approaching corrosive fluid components therewith. This may be effected by introducing nitrogen gas for example, from a remote pressurized source 26 thereof through an internal passage 28 extending through the full length of the lead 16 into the header space 21. In order to assist in the maintenance of the gaseous sheath the external surface of the lead 16 includes a plurality of small longitudinal grooves 30 which at least extend from the end of the lead 16 to the vicinity of the cell wall. The gas disposed within the grooves 30 will diffuse and penetrate the interface between the inner surface of the electrode sleeve 20 and the outer surface of the lead 16 since even with normal machining for a tight fit these surfaces will be sufficiently rough to accommodate a thin gaseous sheath therebetween. As most clearly indicated in FIG. 2, the grooves 30 are made sufficiently small to avoid any material impairment of the desired high degree of electrical contact between the electrode sleeve 20 and the lead 16. As previously mentioned, the surfaces of the lead and sleeve will normally be sufficiently rough to allow the gaseous fluid to penetrate between the two and such roughness or pitting can be artificially enhanced to increase the effective sheathing action. Alternatively a conducting bar lead 16 of natural or artificial porous character can be employed.

The maintenance of the gaseous sheath at the requisite pressure sufficient to repel any approaching corrosive fluids effectively provides a positive pressure gradient which insures a unidirectional flow of sheathing gas away from the lead and outwardly through the pores of the electrode sleeve 20 and main electrode element 14 preferably at minimal, if not approximately zero rate, so that little or no inert sheathing gas will be lost from the system. However, even with a substantial outward flow of sheathing fluid, for example, as would occur with a perforation or break in the electrode sleeve and/or main electrode element, the flow therethrough would be away from the lead 16 and would be such as to repel the introduction of corrosive fluid therethrough with consequent protection of the metal of the lead 16 from the corrosive fluids. As will now be apparent, the pressure of the sheathing fluid need only be larger than the pressure extant within an operating cell. Such permits the use of inexpensive, low pressure apparatus and connections for supplying the sheathing fluid to the electrode assembly, as well as permitted use of an inexpensive seal assembly at the end of the electrode sleeve 20 extending through the cell wall 12.

The described sheathing gas system also functions as an indicator or alarm to warn of deteriorating conditions within a cell and of incipient failure of an electrode assembly. Since the normal flow of inert sheathing gas will be minimal, any noticeable increase in the flow of gas, or a reduction of pressure resulting therefrom, provides a readily detectable indication, as for example, by a marked change in a pressure meter 31 or a flow meter 31A (or both) connected in the fluid system, as shown in FIG. 1, the meters providing a continuous indication of the magnitude of system pressure and rate of sheathing gas flow.

In order to mount the electrode assembly in the cell wall and to provide an effective seal intermediate the sleeves 20 and 23 and the cell wall 12, and between the sleeve 20 and the lead 16, a removable, concentric sealing gland arrangement, generally designated 32 in FIG. 1, is employed, the described arrangement simultaneously insulating the electrode sleeve 20 and lead 16 from the conductive shell 13. More particularly, the sealing arrangement 32 comprises a flanged collar 36 located around the end of the electrode sleeve 20 and secured to the metal shell 13 by a suitable fastening means, such as peripherally spaced studs terminally secured to the shell and extending through the portion of the collar disposed adjacent thereto. The collar is insulated from the shell 13 and bolts by insulating bushings 36 surrounding the bolts in the collar, by an insulating washer 38 located between the collar and shell, and by insulating washers 38A located between the collar and bolt heads. Between the collar 36 and the portion of the sleeve 20 adjacent thereto is disposed an insulating packing material 39, such as asbestos rope, the packing material preferably also being disposed in the space between the cell wall 12, 13 and the insulating sleeve 23 to seal the wall about the sleeve.

Adjacent the end of the collar 36 remote from the shell 13, and disposed about the lead 16, is an insulating bushing 40 held in place over the packing 39 by a rigid plate 41 secured to the collar 36 by fastening bolts extending through the plate and into the portion of the collar adjacent the shell. The portion of the bushing 40 interposed between the inner edge of the plate 41 and the lead 16 effectively insulates the latter as well as the collar 36 from the lead 16 while simultaneously positively securing the packing 39 at the end of the sleeve 20 and around the metal member.

Such a concentric sealing arrangement conveniently serves to seal the cell wall 12 against leakage of the liquids and gases about the insulating sleeve 23, and to seal the sheathing fluid from escaping from the end of the electrode sleeve 20 disposed externally of the cell wall. In addition, the described sealing arrangement maintains the insulation provided by the insulating sleeve 23 located between the conductive cell shell 13 and the sleeve 20 with its metal lead 16.

The portion of the low resistance bar lead 16 extending through the cell wall 13 is further provided with a second internal passage 44 (FIG. 1) for conducting a cooling fluid therethrough. Since the bar 16 is highly conductive, the heat within its associated electrolysis cell would be quickly conducted to all portions thereof including those portions in the vicinity of the sealing arrangement 32. The passage of a cooling fluid through passage 44 aids in maintaining that portion of the lead at a substantially uniform temperature so that expansion and contraction thereof is minimized, if not effectively avoided, in the area of the seals. In this manner, the sealing function of the seals is not adversely affected by temperature changes within and without the cell.

As noted earlier the corrosive fluids within the electrolytic cell may readily penetrate through the interface between the main electrode element 14 and the wall of the cell and thus enter the annular passage 24 intermediate the insulating sleeve 23 and the electrode sleeve 20. Unless impeded therein the corrosive fluid will reach the seals disposed around the electrode assembly elements adjacent the conductive shell 13 of the cell and will there collect and partially freeze. Such partially frozen bath material and deteriorated seals will create a path for current flow between electrode and the conductive shell, thereby reducing the effectiveness of the electrode in the operation of the cell, if not actually shorting out such assembly. The above described cooling of the bar lead 16 and consequent reduction in temperature in the area of the insulating sleeve 23 aids in effecting a selectively located freezing of solidifiable bath material penetrating into the annular barrier space 24 before it reaches the locality of the cell shell 13 and the seals 32. The solidified material then serves as a barrier minimizing further penetration of the bath, and maintaining a high degree of electrical insulation between the electrode sleeve 20 and the lead 16 from the conductive shell 13.

While the invention has been heretofore described in terms of a single layer or sheath of an inert gaseous fluid about the lead 16, two or more such layers could be employed by the use of two or more substantially impervious and concentrically disposed electrode sleeves 20 located about the lead.

It will now be apparent to those skilled in this art that a new and useful electrode structure and assembly has been herein disclosed in which a sheath of chemically inert, gaseous fluid is economically provided around a metal or other low resistance, highly conductive lead extending into an electrode element disposed in a corrosive environment, the metal providing the low voltage drop obtainable with such low resistance metal connections.

The electrode assembly of the invention has been of particular utility in the electrolytic reduction of aluminum from aluminum chloride dissolved in a bath of molten halide and though the invention does not, in itself, make such reduction a commercially viable reality, it does provide a solution to one of the long standing problems that has heretofore impeded progress in this area, and thus contributes to making such reduction process a commercial reality. The invention, however, has appreciable utility in other varying cells and structures of types other than those employed in reducing aluminum from aluminum chloride, as for example, in electrically connected graphite resistance heaters located within a furnace chamber in the production of aluminum chloride from chlorine gas, alumina bearing material and carbon.

While the invention has been described in terms of preferred embodiments, the claims appended hereto are intended to encompass all embodiments which fall within the spirit of the invention.

Having thus described my invention and certain embodiments thereof, I claim:

1. An assembly for conducting electrical current to or from a chamber having a highly corrosive environment, the assembly comprising at least one electrically conductive, low electrical resistance lead member extending into said chamber, the material of said lead member being highly susceptible to corrosive attack by the environment, an electrically conductive sleeve made of a nonmetallic material that is resistant to corrosive attack by the environment located around at least a portion of said lead member, a sheath of fluid located between said lead member and sleeve, and means including said sleeve for maintaining said sheath of fluid around said lead member, said fluid being inert with the materials of the sleeve and lead member and at a pressure sufficient to substantially prevent the corrosive environment from contacting the lead member.

2. The structure of claim 1 in which the means for maintaining the fluid sheath includes a longitudinally extending passage within the lead member, said passage having one terminal end disposed in fluid communication with the periphery of the lead member.

3. The structure of claim 1 in which the conductive sleeve encloses the portion of the lead member disposed within the chamber.

4. The structure of claim 1 in which the chamber includes a chamber defining wall, with the electrically conductive lead and sleeve traversing said wall, an electrically insulating sleeve member disposed around at least the portion of the conductive sleeve that traverses said defining wall.

5. The structure of claim 4 including means for cooling the lead member along at least a portion thereof that transverses the chamber wall.

6. The structure of claim 1 including means for indicating the magnitude of a pressure of the inert fluid maintained around the lead.

7. The structure of claim 1 including means responsive to a change in the magnitude of the pressure of the inert fluid maintained around the lead for providing an attention arresting indication thereof.

* * * * *